UNITED STATES PATENT OFFICE.

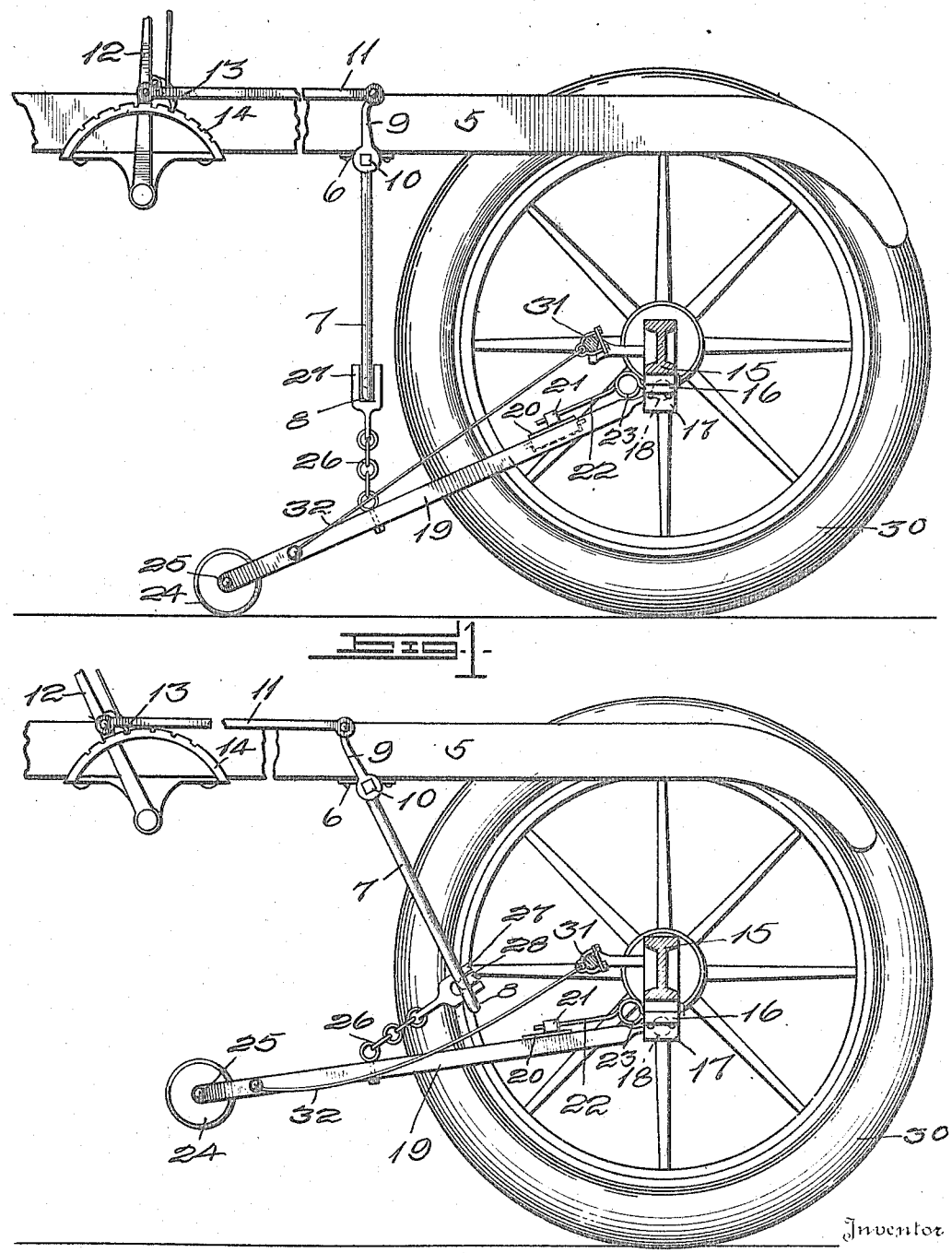

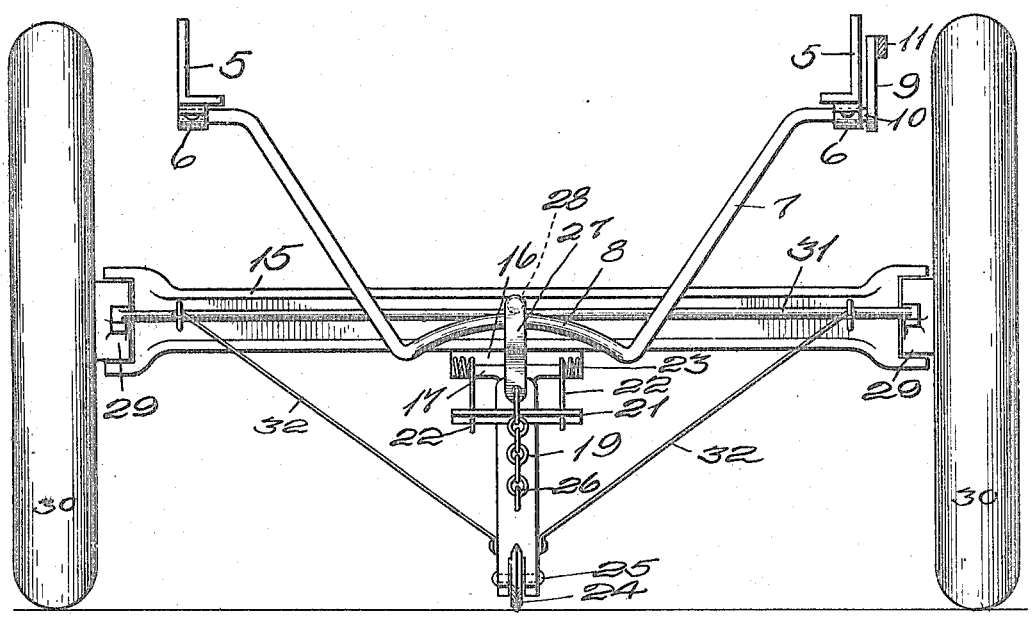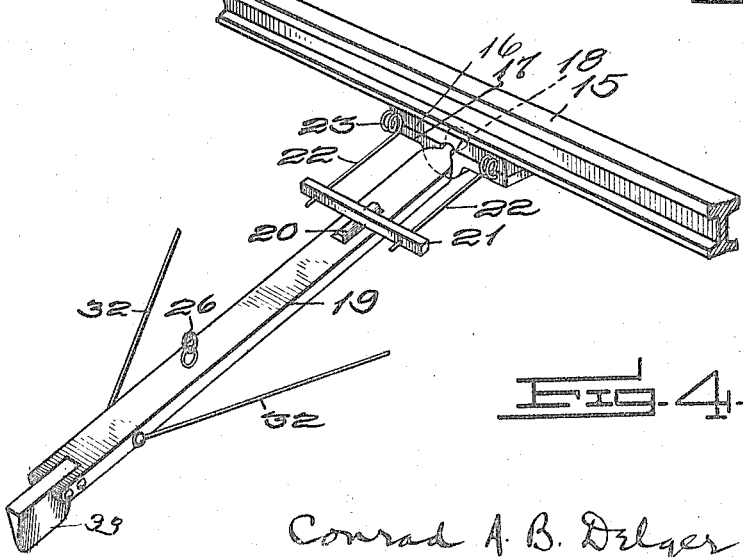

CONRAD A. B. DELGER, OF DELGER TOWNSHIP, WELLS COUNTY, NORTH DAKOTA.

ANTISKIDDING ATTACHMENT FOR AUTOMOBILES.

1,133,272.  Specification of Letters Patent.  Patented Mar. 30, 1915.

Application filed July 29, 1914. Serial No. 853,939.

*To all whom it may concern:*

Be it known that I, CONRAD A. B. DELGER, a citizen of the United States of America, residing at Delger township, in the county of Wells and State of North Dakota, have invented certain new and useful Improvements in Antiskidding Attachments for Automobiles, of which the following is a specification.

This invention relates to anti-skidding attachments for motor vehicles and particularly for automobiles.

The object of the invention being to provide an attachment which is connected with the steering mechanism of the automobile so that the driver is enabled to impart movement to the anti-skidding attachment through the steering mechanism.

Further objects and advantages of the invention will be set forth in the detailed description which now follows.

In the accompanying drawing, Figure 1 is a view partly in side elevation and partly in section illustrating a portion of the chassis of an automobile, and showing the anti-skidding attachment in operative position. Fig. 2 is a like view with the attachment in inoperative position. Fig. 3 is a view from the rear side of the front axle showing the attachment in lowered or operative position, and Fig. 4 is a perspective view of certain parts of the attachment.

Referring to the drawing, 5 designates the side members of the frame or chassis of an automobile. Journaled in bearings 6, carried by said side members 5, is a crank 7, the central portion 8 of which is of bow formation. A crank 9, is mounted upon the end 10 of the aforesaid crank 7, and by means of a connecting rod 11 and swinging hand lever 12, swinging movement may be imparted to the crank 7. A pawl 13 and rack 14, of the usual and well known construction render it possible to hold the crank 7, in the position illustrated in Fig. 2, when desired. The front axle of the automobile is indicated at 15, and has secured to its face blocks 16 and 17, which together with a rounded head 18 of swinging arm 19, constitute a ball and socket joint so that the arm 19, may move both vertically and horizontally. Journaled in the upper face of arm 19 is a roller 20, upon which the transverse block 21, bears. Said block is carried by the arms 22 of a spring 23, said spring normally tending to force the arm 19 downwardly, to bring the disk 24, which is journaled at 25 in arm 19, into contact with the ground. A chain 26, has one end connected to arm 19, and its opposite end connected to a clevis 27, which carries a roller 28 grooved to conform to the shape of the central portion 8 of crank 7, and traveling thereover. The usual steering knuckles 29, of the steering or front wheels 30, are connected as usual, by a steering rod 31, to which movement is imparted from the usual hand steering wheel not shown. But in addition, this steering rod 31, is connected by members 32, to the swinging arm 19. These members 32, are preferably flexible cables or the like and their function is to impart the movement of the steering rod to arm 19, so that the driver may through the steering mechanism, actuate a ground engaging member, viz., disk 24, to resist the skidding action of the vehicle.

It is well known that the steering mechanisms of automobiles are usually so arranged as to give the driver the advantage in leverage over the ground wheels. In other words, a considerable movement of the steering wheels is necessary to impart a slight movement to the ground wheels. Consequently, considerable power may be exerted through the steering mechanism to accomplish the results set forth.

I am aware of the fact that it has been heretofore proposed to mount upon an automobile an anti-skidding device which engages with the ground and physically resists the skidding action, but I am not aware that it has ever been proposed to mount such a device in operative relation to the steering mechanism and thereby permit a manual resistance of the skidding action by the operator.

Normally, the parts are in the position illustrated in Fig. 2. That is, the hand lever 12, has been moved to such position as to swing arm 19, upwardly out of engagement with the ground. If the vehicle starts to skid, the hand lever is released, and spring 23 immediately acts to force the disk 24, into engagement with the ground, the arrangement of bar 21 and roller 20 being such as to permit a free movement of arm 19 while maintaining the spring pressure upon said arm. The curvature of the central part 8 of the arm, is such as to permit a lateral movement of arm 19 without the disk 24, moving out of engagement with the ground, despite the fact that this arm is swinging upon the arc of the circle, for the arrangement of the central part of the crank upon the arc of the circle, is such as to accomplish the object sought. This is due to the fact that as the roller 28 travels to the lowermost or outer part of the part 8 it has the effect of slackening the connection 26 to permit the aforesaid result. In Fig. 4, I have illustrated a runner 33, which may be substituted for the disk 24, if desired.

While the elements shown and described are well adapted to serve the purpose for which they are intended, it is to be understood that the invention is not limited to the precise construction set forth, but includes within its purview such changes as may be made within the scope of the appended claims.

Having described my invention what I claim is:

1. In a device of the character described the combination with an automobile and its steering wheels of a member mounted for lateral movement upon said automobile, means normally tending to move said member into engagement with the ground, connections between said member and the steering gear of the automobile and manually operable means for withdrawing said laterally movable member from engagement with the ground.

2. In a device of the character described, the combination with an automobile and its steering wheels, of an arm mounted for universal movement upon the front axle of the automobile, a ground engaging member carried by said arm and connections between said arm and the steering mechanism of the automobile.

3. In a device of the character described, the combination with an automobile and its steering wheels of an arm mounted for universal movement upon the front axle of the automobile a ground engaging member carried by said arm and connections between said arm and the steering mechanism of the automobile, and spring means bearing upon said arm and normally tending to move said ground engaging member toward the ground.

4. In a device of the character described, the combination with an automobile and its steering wheels of an arm mounted for universal movement upon the front axle of the automobile, a ground engaging member carried by said arm and connections between said arm and the steering mechanism of the automobile, and spring means bearing upon said arm and normally tending to move said ground engaging member toward the ground, a spring, a member carried by said spring and a roller carried by said arm, and upon which said member bears.

5. In a device of the character described, the combination with an automobile and its steering wheel of an arm mounted for universal movement upon the front axle of the automobile, a ground engaging member carried by said arm and connections between said arm and the steering mechanism of the automobile, spring means bearing upon said arm and normally tending to move said ground engaging member toward the ground, a spring, a member carried by said spring, a roller carried by said arm, and upon which said member bears, a swingingly mounted crank manual operating means for said crank, said crank having an arcuate portion and a connection between said arm and said arcuate portion.

6. In a device of the character described, the combination with an automobile and its steering wheels of an arm having a ball and socket mounting upon the front axle of the automobile, a ground engaging member carried by the rear of said arm, connections between said arm and the steering mechanism of the automobile, spring means normally tending to force said arm toward the ground, a crank mounted upon the automobile frame manual operable means for imparting swinging movement to said crank, said crank having a central arcuate portion, a grooved roller traveling over said arcuate portion and a connection between said roller and said arm.

7. In a device of the character described the combination with an automobile and its steering mechanism, of a laterally movable ground engaging member supported from said automobile, a connection between said member and said steering mechanism, a manually operable member comprising a swinging crank having an arcuate portion, a traveling member upon said arcuate portion and a connection between said traveling member and the ground engaging member.

In testimony whereof I affix my signature in the presence of two witnesses.

CONRAD A. B. DELGER.

Witnesses:
E. T. SWANSON,
T. HUBBARD.